(12) United States Patent
Axnix et al.

(10) Patent No.: US 8,881,166 B2
(45) Date of Patent: *Nov. 4, 2014

(54) METHOD, DATA PROCESSING PROGRAM, AND COMPUTER PROGRAM PRODUCT TO COMPENSATE FOR COUPLING OVERHEAD IN A DISTRIBUTED COMPUTING SYSTEM, AND CORRESPONDING OVERHEAD CALCULATOR FOR A DISTRIBUTED COMPUTING SYSTEM AND CORRESPONDING COMPUTER SYSTEM

(71) Applicant: International Business Machines Corporation, Armonk, NY (US)

(72) Inventors: Christine Axnix, Boeblingen (DE); Rolf Fritz, Boeblingen (DE); Juergen Probst, Boeblingen (DE); Thomas Schlipf, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,675

(22) Filed: Feb. 6, 2014

(65) Prior Publication Data

US 2014/0157273 A1 Jun. 5, 2014

Related U.S. Application Data

(63) Continuation of application No. 12/966,660, filed on Dec. 13, 2010, now Pat. No. 8,677,372.

(30) Foreign Application Priority Data

Dec. 17, 2009 (EP) ..................................... 09179289

(51) Int. Cl.
*G06F 9/46* (2006.01)
*G06F 15/173* (2006.01)
*G06F 9/455* (2006.01)
*G06F 9/50* (2006.01)
*H04L 29/08* (2006.01)

(52) U.S. Cl.
CPC ............ *H04L 67/10* (2013.01); *G06F 9/45558* (2013.01); *G06F 9/5077* (2013.01); *G06F 9/45533* (2013.01)
USPC ............ 718/104; 718/105; 718/100; 709/226

(58) Field of Classification Search
None
See application file for complete search history.

(56) References Cited

U.S. PATENT DOCUMENTS

| 5,564,040 | A | 10/1996 | Kubala |
| 7,007,276 | B1 | 2/2006 | Kubala et al. |

(Continued)

OTHER PUBLICATIONS

Freeman et al., "Division of Labor: Tools for Growing and Scaling Grids".

(Continued)

*Primary Examiner* — Abdullah Al Kawsar
*Assistant Examiner* — Bing Zhao
(74) *Attorney, Agent, or Firm* — Griffiths & Seaton PLLC (57) ABSTRACT

An improved method to compensate for coupling overhead in a distributed computing system offering a raw processing capacity, comprising an effective processing capacity (404) and the coupling overhead, is disclosed, wherein the distributed computing system comprises at least one computer system and at least one coupling facility. The method comprises determining a coupling efficiency, determining and adding an amount of missing processing capacity to the effective processing capacity based on the coupling efficiency in a way that the effective processing capacity of the raw processing capacity corresponds to a billable target processing capacity.

13 Claims, 4 Drawing Sheets

(56) References Cited

U.S. PATENT DOCUMENTS

| | | |
|---|---|---|
| 7,051,188 B1 | 5/2006 | Kubala et al. |
| 7,159,221 B1 | 1/2007 | Willen et al. |
| 7,194,616 B2 | 3/2007 | Axnix et al. |
| 7,231,504 B2 | 6/2007 | Kashyap et al. |
| 7,412,705 B2 | 8/2008 | Misra |
| 7,644,162 B1 | 1/2010 | Zhu et al. |
| 7,676,578 B1 | 3/2010 | Zhu et al. |
| 7,748,005 B2 | 6/2010 | Romero et al. |
| 2005/0010667 A1 | 1/2005 | Moriki et al. |
| 2006/0230400 A1 | 10/2006 | Armstrong et al. |
| 2007/0067432 A1 | 3/2007 | Tarui et al. |
| 2009/0013327 A1 | 1/2009 | Bulfin |

OTHER PUBLICATIONS

IBM, "zSeries 900 Processor Resource/Systems Manager™ (PR/SM™) Planning Guide, SB 10-7033-00" 316 pages, Mar. 2001.

Sotomayor, et al., "Overhead Matters: A Model for Virtual Resource Management".

METHOD, DATA PROCESSING PROGRAM, AND COMPUTER PROGRAM PRODUCT TO COMPENSATE FOR COUPLING OVERHEAD IN A DISTRIBUTED COMPUTING SYSTEM, AND CORRESPONDING OVERHEAD CALCULATOR FOR A DISTRIBUTED COMPUTING SYSTEM AND CORRESPONDING COMPUTER SYSTEM

PRIORITY CLAIM

This application is a Continuation of U.S. patent application Ser. No. 12/966,660, filed on Dec. 13, 2010, which claims priority to European Patent Application No. EP09179289.5, filed Dec. 17, 2009, all of which are hereby incorporated by reference in its entirety.

BACKGROUND OF THE INVENTION

1. Field of the Invention

The present invention relates in general to the field of capacity adjustment to achieve a predefined level of system or subsystem performance in distributed computing systems, and in particular to a method to compensate for coupling overhead in a distributed computing system, a corresponding overhead calculator for the distributed computing system and a distributed computing system. Still more particularly, the present invention relates to a data processing program and a computer program product to compensate for coupling overhead in a distributed computing system.

2. Description of the Related Art

Distributed computing systems providing data sharing capability like "IBM System z Parallel SysPlex (System processing complex)" may be composed of multiple computer systems. Each may virtualize its resources and provide the processing capacity in containers, e.g. IPARs' (Logical PARtition) in System z. Each of those containers (LPARs) is controlled by an operating system running multiple applications. For background information, refer to U.S. Pat. No. 5,564,040 to Kubala, assigned to International Business Machines Corporation, Armonk, N.Y., US, filed 8 Nov. 1994, issued 8 Oct. 1996, "Method and Apparatus for Providing a Server Function in a Logically Partitioned Hardware Machine", which describes aspects of logical partitioning. The LPAR hypervisor is typically referred to as the "LPAR manager". More detailed reference material can be found in IBM zSeries 900 Processor Resource/Systems Manager™ (PR/SM™) Planning Guide, SB 10-7033-00, March 2001.

Software pricing can relate to the overall capacity of the SysPlex, to a single computer system (box), to the capacity of a LPAR or to a set of LPARs. In all these cases, software pricing relates to the defined static amount of capacity. System z, e.g., specifies such capacity in MSUs (Million Service Units), while others may use MIPS or other bench mark related metrics.

A distributed computing system like 'System z Parallel SysPlex' provides multiple advantages over single box computer systems, such as better availability and increased and scalable overall capacity. However, there is a bill with it. The intended part of the bill is specified by explicit pricing of functions and features. The unintended part of the bill is the additional overhead of the coupling system, e.g. Parallel SysPlex. One part of the overhead is specific coupling infrastructure, e.g., coupling facility on System z. The other part is the overhead for applications and underlying middleware and operation system executing on the regular customer processors. This overhead eats up machine cycles, which are lost for the execution of application code. The overhead is dependent on multiple factors of static and dynamic nature, e.g., hardware level of the boxes, hardware type of the coupling network, distance of the boxes, respectively the length of the cables between the boxes, application types, intensity of data sharing etc.

Constant overhead independent of the specific configuration would be very similar to running applications on different processor types and could easily be considered by an appropriate fix term software pricing. Unfortunately, the above listed influence factors make the efficiency of the Parallel SysPlex variable and fluctuating.

In U.S. Pat. No. 7,194,616 B2 "Flexible temporary capacity upgrade/downgrade in a computer system without involvement of the operating system" to Axnix et al. a method and a device for concurrent removal of processor capacity form a running computer is disclosed. The disclosed method and device may, e.g., be used for non-disruptive removal of processors from the enabled physical configuration without any involvement of the operating system. The computer comprises a resource controller being configured to control a physical resource pool including the actual physical resources and a capacity virtualizer configured to provide multiple sets of virtual resources from a capacity virtualizer resource pool, whereby the provided sets of virtual resources allow hosting independent operating systems concurrently. The method comprises the steps of the resource controller requesting the capacity virtualizer to reduce the capacity virtualizer resource pool, the capacity virtualizer removing resources from the capacity virtualizer resource pool, and the resource controller disabling physical resources corresponding to the resources removed from the capacity virtualizer resource pool.

The capacity, also called performance, of a computer system as part of the distributed computing system in terms of throughput and response times depends on its hardware and the software running on the hardware. The hardware capacity mainly depends on the performance of the one or more processors being present in the computer system, the number of processors and the efficiency of their cooperation, the size and access rates of the main storage, and the I/O bandwidth and its latencies. Such structure of a computer system comprising the processors, the respective cache infrastructure, and the I/O connection infrastructure may be referred to as the central electronic complex (CEC).

In business, software licensing is often based on the overall capacity of such a central electronic complex (CEC). By adding or removing processors, the CEC capacity may be changed. Software can recognize the CEC performance by different methods. It may directly retrieve the capacity indicators from the hardware via special instructions or it may count it out in some short spin loops. According to the specific license agreement, software may be limited to execute up to a predefined CEC capacity level, or royalties may be charged in accordance with the recognized actual CEC capacity.

Under such circumstances, the customer seeks to minimize the amount of software license royalties by enabling CEC capacity appropriate to the customer's actual needs. This is especially important for capacity backup computer centers with much dormant capacity installed, waiting to be enabled in case of a disaster, e.g., the total breakdown of a primary computer center. Such systems run at medium, low, or even very low CEC capacity, called the enabled capacity. The disabled (dormant) capacity may by far exceed the enabled capacity. For big installations, the CEC capacity driven software license fee for a computer center may be multiple millions of dollars a year, exceeding the cost of the dormant hardware.

SUMMARY OF THE INVENTION

The technical problem underlying the invention is to provide a method to compensate for coupling overhead in a distributed computing system and an overhead calculator for the distributed computing system and a distributed computing system, which are able to prevent that the dependency of the coupling efficiency on the chosen hardware levels of the computer systems, the coupling infrastructure like network technology as well as the distance does impact the software pricing, and to provide a data processing program and a computer program product to perform the method to compensate for coupling overhead in a distributed computing system.

According to the invention this problem is solved by providing a method to compensate for coupling overhead in a distributed computing system, an overhead calculator for a distributed computing system, a distributed computing system, a data processing program for performing the method to compensate for coupling overhead in a distributed computing system, and a computer program product causing a computer to perform the method to compensate for coupling overhead in a distributed computing system.

Accordingly, in an embodiment of the present invention a method to compensate for coupling overhead in a distributed computing system offering a raw processing capacity, comprising an effective processing capacity and the coupling overhead, wherein distributed computing system comprises at least one computer system and at least one coupling facility, comprises determining a coupling efficiency, determining and adding an amount of missing processing capacity to the effective processing capacity based on the coupling efficiency in a way, that the effective processing capacity of the raw processing capacity corresponds to a billable target processing capacity.

In further embodiments of the present invention, dynamic coupling overhead indicators and/or static configuration parameters of the distributed computing system are considered to determine the coupling efficiency.

In further embodiments of the present invention, the dynamic coupling overhead indicators comprise information about applications and/or software code running on the distributed computing system and/or information about intensity of data sharing between components of the distributed computing system and/or about rates of coupling overhead critical instructions.

In further embodiments of the present invention, the static configuration parameters of the distributed computing system comprise information about technology of used hardware components of the distributed computing system and/or about distances between hardware components of the distributed computing system and resulting cable length.

In further embodiments of the present invention, effective processing capacity corresponds to a measurable processing capacity of the distributed computing system or a part of the distributed computing system with a given raw processing capacity.

In further embodiments of the present invention, the raw processing capacity corresponds to a capacity of the distributed computing system or a corresponding part of the distributed computing system that would be measured if the distributed computing system or a corresponding part of the distributed computing system is working without any coupling.

In further embodiments of the present invention, the coupling efficiency corresponds to a ratio of the effective processing capacity to the raw processing capacity.

In another embodiment of the present invention, an overhead calculator for a distributed computing system, which comprises at least one computer system and at least one coupling facility is provided, wherein the distributed computing system offers a raw processing capacity, comprising an effective processing capacity and a coupling overhead, wherein the overhead calculator is implemented in firmware and/or in electronic circuits and determines a coupling efficiency inside the distributed computing system to compensate for the coupling overhead in the distributed computing system.

In further embodiments of the present invention, the overhead calculator considers dynamic coupling overhead indicators and/or static configuration parameters of the distributed computing system to determine the coupling efficiency.

In another embodiment of the present invention, a distributed computing system comprising at least one computer system and at least one coupling facility is provided, wherein the distributed computing system offers a raw processing capacity, comprising an effective processing capacity and a coupling overhead, wherein at least one hypervisor is implementing a method to compensate for the coupling overhead in at least one computer system of the distributed computing system.

In further embodiments of the present invention, at least one overhead calculator is provided in the distributed computing system.

In further embodiments of the present invention, the at least one overhead calculator provides the determined coupling efficiency to at least one processing capacity adjustment controller which in turn determines the amount of processing capacity to add and provides the determined amount of processing capacity to the at least one hypervisor.

In further embodiments of the present invention, the at least one hypervisor takes additional processing capacity from a same computer system and/or another computer system and provides the total raw processing capacity to the distributed computing system or a part of the distributed computing system to compensate for the coupling overhead by dispatching work to regular computer systems and/or to offload computer systems of the distributed computing system.

In another embodiment of the present invention, a data processing program for execution in a data processing system comprises software code portions for performing a method to compensate for coupling overhead in a distributed computing system when the program is run on the data processing system.

In yet another embodiment of the present invention, a computer program product stored on a computer-usable medium, comprises computer-readable program means for causing a computer to perform a method to compensate for coupling overhead in a distributed computing system when the program is run on the computer.

All in all, embodiments of the present invention disclosed herein make the effective capacity of a container constant or keep it within a small capacity range, so that especially the dependency of the coupling efficiency on the chosen hardware levels of the computer systems, the coupling infrastructure like network technology as well as the distance between the computer systems of the distributed computing system do not impact the software pricing. Embodiments of the invention provide compensation of coupling overhead with additional raw capacity not driving any software license fee, so that the customer pays advantageously only for infrastructure and function and not for coupling overhead.

The core idea of this invention is to compensate the coupling overhead by adding capacity from dormant processors or from processors with a processor type without influence to the capacity definition driving the software price. Firmware is aware of the static configuration and its characteristics and can also measure dynamic values like 'coupling overhead critical instruction rates'. At least one capacity calculator can calculate the coupling efficiency from this and provide the value to the at least one capacity adjustment controller which then tells the at least one hypervisor component in firmware how much processing capacity to add. The at least one hypervisor takes additional processing capacity from a separate engine and provides the total raw processing capacity to the container by dispatching work to regular engines and to off-load engines.

The described functionalities of the at least one hypervisor and/or the at least one overhead calculator and/or the at least one capacity adjustment controller can be implemented in one or more, preferably in all computer systems of the distributed computing system or can be implemented just once for the whole distributed computing system.

The above, as well as additional purposes, features, and advantages of the present invention will become apparent in the following detailed written description.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
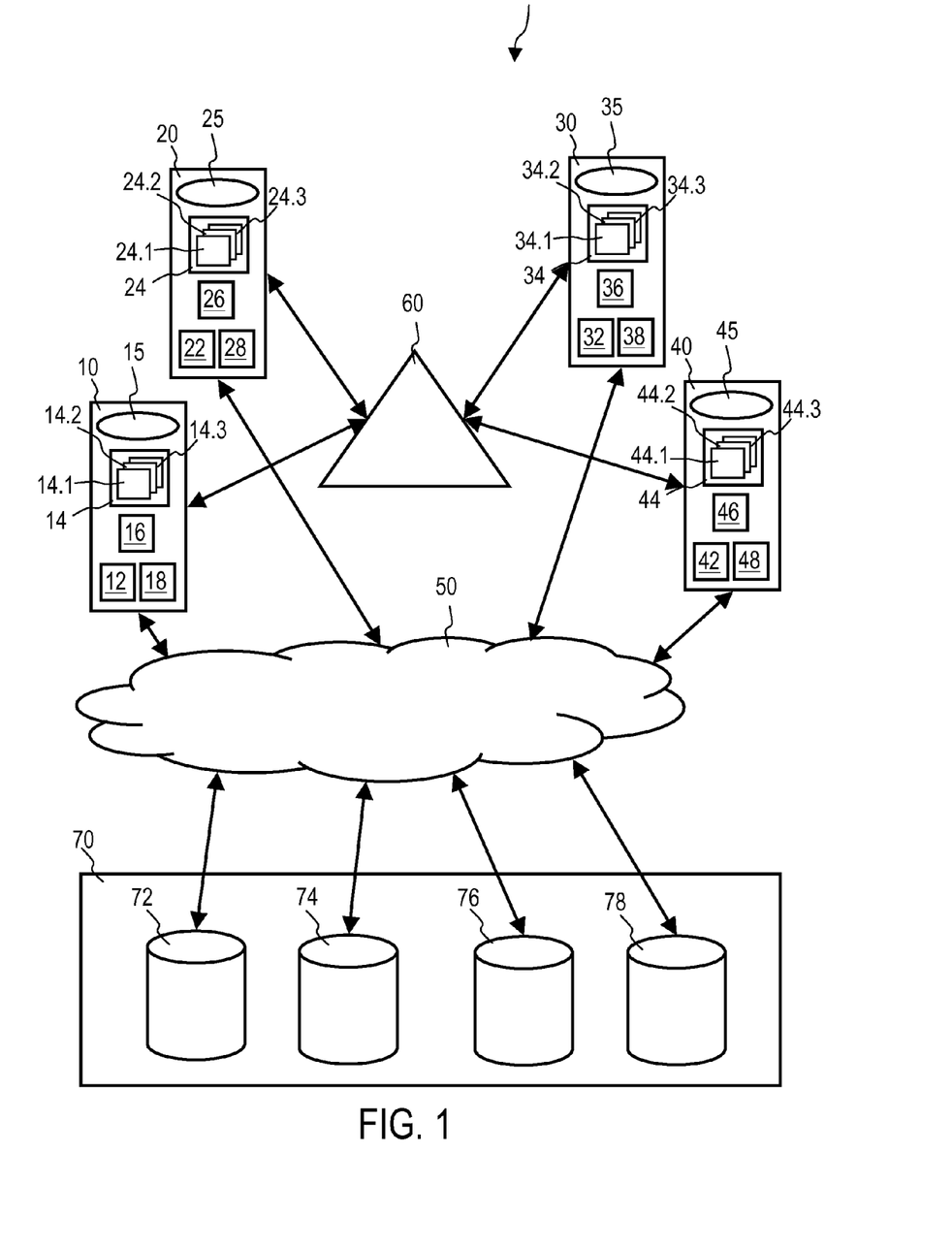
FIG. 1 is a schematic block diagram of an a distributed computing system, in accordance with an embodiment of the present invention.

FIG. 1 shows a distributed computing system 1, in accordance with an embodiment of the present invention. Referring to FIG. 1, the shown embodiment of the invention employs a distributed computing system 1 comprising at least one computer system 10, 20, 30, 40, a storage network 50, at least one coupling facility 60, and a storage device 70 with a plurality of storage units 72, 74, 76, 78. The distributed computing system 1 may be, e.g., an IBM zSeries 900 enterprise server or a SUN UE 10000 mainframe. Each computer system 10, 20, 30, 40 of the distributed computing system 1 comprises a main storage 16, 26, 36, 46, a central electronics complex (CEC) 14, 24, 34, 44, power supply and cooling devices 12, 22, 32, 42 and input/output channels 18, 28, 38, 48, and a firmware module 15, 25, 35, 45. The central electronics complex (CEC) 14, 24, 34, 44 includes one or more physical processors 14.1, 24.1, 34.1, 44.1, a cache 14.2, 24.2, 34.2, 44.2, and an interface 14.3, 24.3, 34.3, 44.3. The power supply and cooling devices 12, 22, 32, 42 are drawn in one block purely for the sake of clarity. It is acknowledged that those devices may be implemented as separate devices. Both devices provide part of the infrastructure to allow the computer system to operate.

The input/output channels 18, 28, 38, 48 may be formed by one or more input/output adapters as generally provided and known in the art. The input/output channels 18, 28, 38, 48 may be connected to disks, tapes, terminals, LANs (Local Area Networks), printers or other input/output devices or input/output subsystems. The firmware module 15, 25, 35, 45 may run on one or more of the processors 14.1, 24.1, 34.1, 44.1 for internal purposes, e.g., to communicate with a hardware console or to implement complex instructions.

In terms of resources the distributed computing system 1 provides processor capacity, storage, and input/output paths. The overall processor capacity is mainly determined by the number of processors, the performance of a single processor, cache size and cache access efficiency. Therefore, it is also called CEC capacity. The main storage 16, 26, 36, 46 provides space for storing the instructions (programs) and the data.

Figure 2:
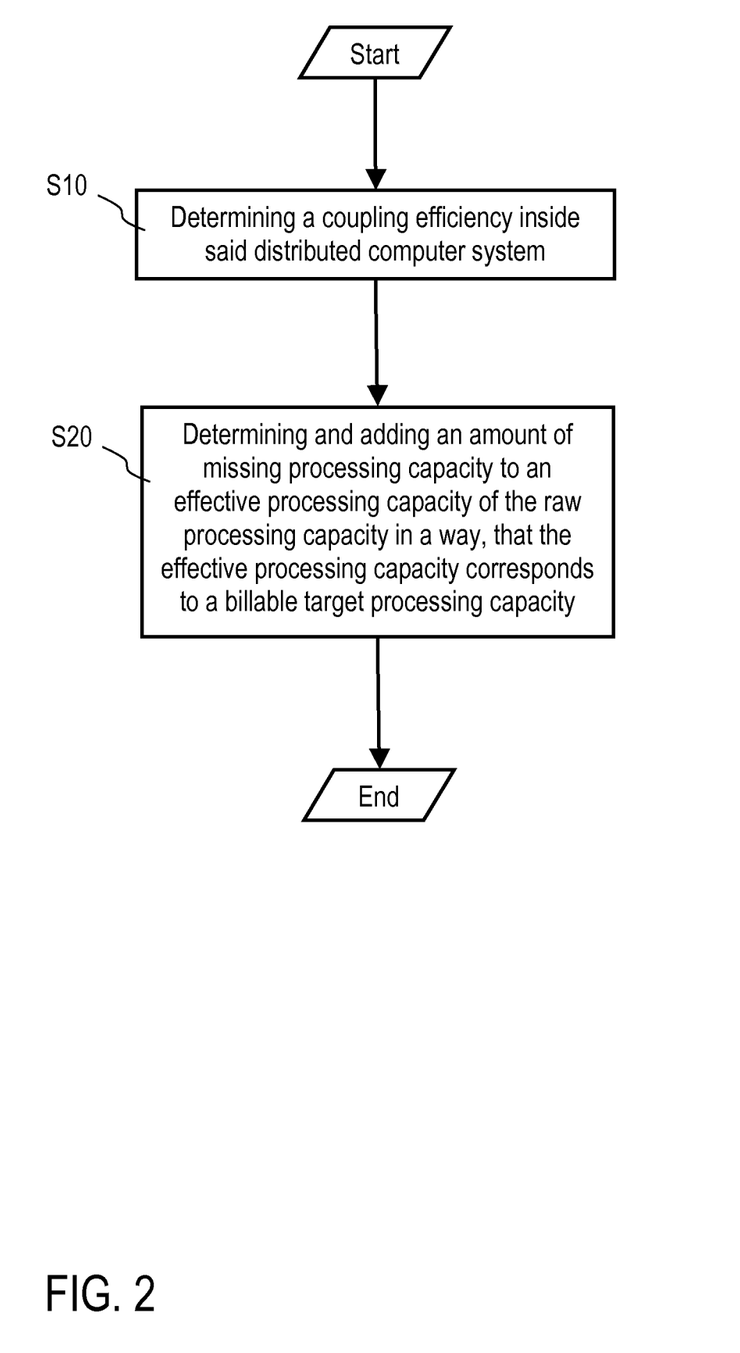
FIG. 2 is a schematic flow chart of a method to compensate for coupling overhead in a distributed computing system, in accordance with an embodiment of the present invention.
Figure 3:
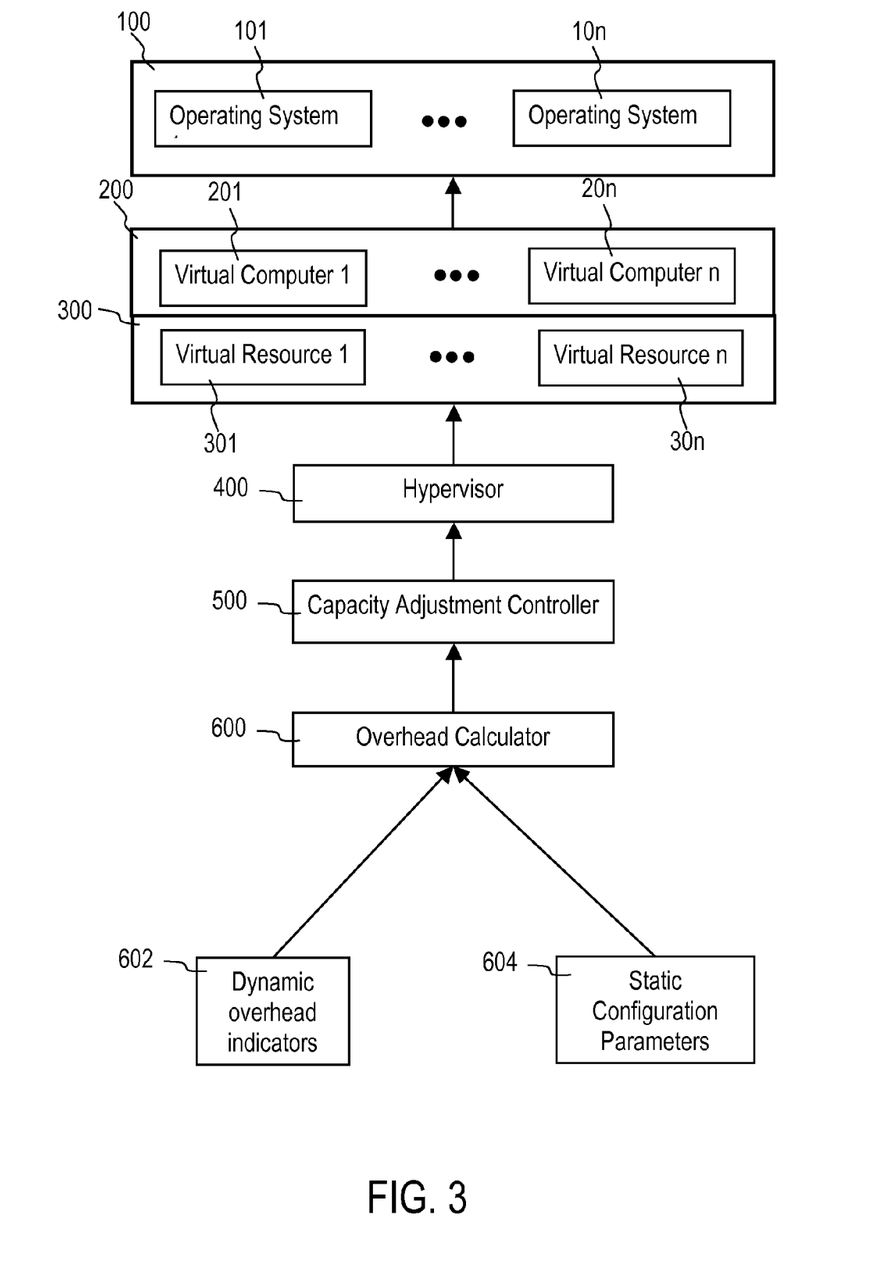
FIG. 3 is a schematic block diagram providing a logical view of the distributed computing system, in accordance with an embodiment of the present invention.
Figure 4:
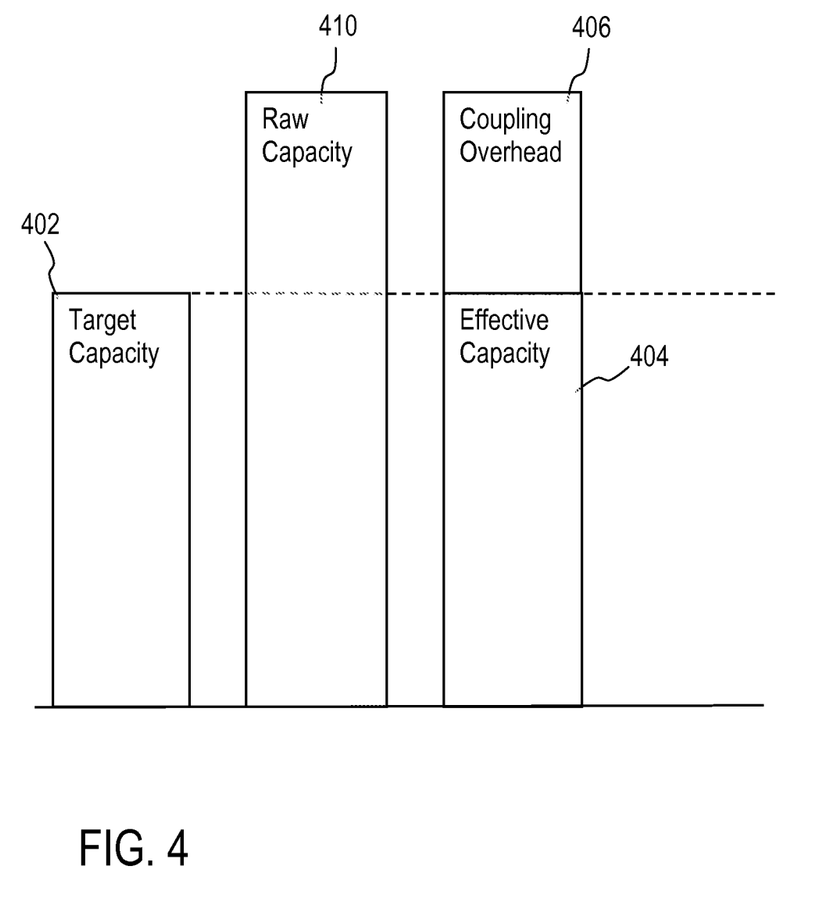
FIG. 4 is a schematic diagram showing the relationship between raw processing capacity, coupling overhead, effective processing capacity and target processing capacity.

FIG. 2 is a schematic flow chart of a method to compensate for coupling overhead 406 in a distributed computing system 1, in accordance with an embodiment of the present invention, FIG. 3 shows a logical view of the distributed computing system 1, and FIG. 4 is a schematic diagram showing the relationship between a raw processing capacity 410, coupling overhead 406, effective processing capacity 404 and target processing capacity 402. The distributed computing system offers the raw processing capacity 410, comprising the effective processing capacity 404 and the coupling overhead 406.

Referring to FIGS. 2 to 4 it is explained, how the method to compensate for coupling overhead in a distributed computing system 1 is implemented in the distributed computing system 1.

Referring to FIG. 2 in a step S10 a coupling efficiency inside that distributed computing system 1 is determined. In a step S20 an amount of missing processing capacity is determined and added to the effective processing capacity 404 based on the coupling efficiency in a way that the effective processing capacity 404 of the raw processing capacity 410 corresponds to a billable target processing capacity 402. The effective processing capacity 404 corresponds to a measurable processing capacity of the distributed computing system 1 or a part 10, 20, 30, 40, 201 to 20n of the distributed computing system 1 with a given raw processing capacity 410. The raw processing capacity 410 corresponds to a capacity of the distributed computing system 1 or a corresponding part 10, 20, 30, 40, 201 to 20n of the distributed computing system 1 that would be measured if the distributed computing system 1 or a corresponding part 10, 20, 30, 40, 201 to 20n of the distributed computing system 1 is working without any coupling. The coupling efficiency corresponds to a ratio of the effective processing capacity 404 to the raw processing capacity 410.

While FIG. 1 focuses on the physical entities, i.e., the hardware of the distributed computing system 1, FIG. 3 illustrates the logical view of the distributed computing system 1. Referring to FIG. 3 the distributed computing system 1 comprises a virtual computer pool 200 with a plurality of virtual computers 201 to 20n, whereby the number n of virtual Computers 201 to 20n, may only be limited by the overall performance capability of the underlying hardware units 10, 20, 30, 40, 50, 60 of the distributed computing system 1. A virtual resource pool 300 with a plurality of virtual resources 301 to 30n is associated to each of the one or more virtual computers 201 to 20n. The virtual resource pools 300 include all virtualized resources 301 to 30n, such as logical processors, shares of input/output paths and storage devices 70. In the virtual resource pool 300 two types of resources 301 to 30n are distinguished, namely, resources like processor capacity that can be shared and resources like main storage 16, 26, 36, 46 that can only be dedicated to a particular virtual computer 201 to 20n. The virtual Computers 201 to 20n may be loaded with independent operating systems hosting middle ware and application software. It should be noted that each of the virtual computers 201 to 20n is independent of any of the other virtual computers 201 to 20n, like different physical computers in separate boxes.

In each of the virtual computers 201 to 20n one operating system 101 to 10n of an operating system pool 100 is running. The operating system pool 100 host middle ware and application programs. Most virtual computers 201 to 20n provide their total resources to a single operating system 101 to 10n that controls the virtualized resources 301 to 30n and provides them to the application programs.

According to the invention the distributed computing system 1, as illustrated in FIG. 3, contains an overhead calculator 600 which is implemented in firmware 15, 25, 35, 45 and/or in electronic circuits and determines a coupling efficiency inside the distributed computing system 1 to compensate for the coupling overhead 406 in the distributed computing system 1. The overhead calculator 600 considers dynamic coupling overhead indicators 602 and/or static configuration parameters 604 of the distributed computing system 1 to determine the coupling efficiency.

The dynamic coupling overhead indicators 602 comprise information about applications and/or software code running on the distributed computing system 1 and/or information about intensity of data sharing between components 10, 20, 30, 40, 50, 60, 70 of the distributed computing system 1 and/or about rates of coupling overhead critical instructions, for example. The static configuration parameters 604 of the distributed computing system 1 comprise information about technology of used hardware components 10, 20, 30, 40, 50, 60, 70 of the distributed computing system 1 and/or about distances between hardware components 10, 20, 30, 40, 50, 60, 70 of the distributed computing system 1 and resulting cable length, for example.

Still referring to FIG. 3 the overhead calculator 600 provides the determined coupling efficiency to a processing capacity adjustment controller 500 which in turn determines the amount of processing capacity to add and provides the determined amount of processing capacity to a hypervisor 400. The hypervisor 400 is assigning the hardware units 10, 20, 30, 40, 50, 60, 70 to the virtual computers 201 to 20n and takes additional processing capacity from a same computer system 10, 20, 30, 40 and/or another computer system 10, 20, 30, 40 and provides the total raw processing capacity 410 to the distributed computing system 1 or a part 10, 20, 30, 40, 201 to 20n of the distributed computing system 1 to compensate for the coupling overhead 406 by dispatching work to regular computer systems 10, 20, 30, 40 and/or to offload computer systems 10, 20, 30, 40 of the distributed computing system 1. According to the invention the hypervisor 400 implements the method to compensate for coupling overhead 406 in the distributed computing system 1. The hypervisor 400 may be implemented in a firmware module 15, 25, 35, 45 or in electronic circuits or in a mixture of both.

In the shown embodiment the functionalities of the hypervisor 400, the overhead calculator 600 and the capacity adjustment controller 500 are implemented in all computer systems 10, 20, 30, 40 of the distributed computing system 1. In alternative embodiments, not shown, the described functionalities of the hypervisor 400, the overhead calculator 600 and the capacity adjustment controller 500 can be implemented in one or more computer systems 10, 20, 30, 40 of the distributed computing system 1 or can be implemented just once for the whole distributed computing system 1.

The inventive method to compensate for coupling overhead in a distributed computing system can be implemented as an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method to compensate for coupling overhead of a coupling system in a distributed computing system offering a raw processing capacity, the raw processing capacity comprising an effective processing capacity and the coupling overhead, wherein said distributed computing system comprises at least one computer system and at least one coupling facility, the method comprising:

determining a coupling efficiency;

determining and adding an amount of missing processing capacity to said effective processing capacity based on said coupling efficiency in a way, that the effective processing capacity of said raw processing capacity corresponds to a billable target processing capacity, wherein dynamic coupling overhead indicators and static configuration parameters of said distributed computing system are considered to determine said coupling efficiency, and the coupling efficiency corresponds to a ratio of said effective processing capacity to said raw processing capacity; and determining the coupling efficiency inside said distributed computing system to compensate for said coupling overhead in said distributed computing system using an overhead calculator.

2. The method according to claim 1, wherein said dynamic coupling overhead indicators comprise information about applications and software code running on said distributed computing system and information about intensity of data sharing between components of said distributed computing system and/or about rates of coupling overhead critical instructions.

3. The method according to claim 1, wherein said static configuration parameters of said distributed computing system comprise information about technology of used hardware components of said distributed computing system and about distances between hardware components of said distributed computing system and resulting cable length.

4. The method according to claim 2, wherein said static configuration parameters of said distributed computing system comprise information about technology of used hardware components of said distributed computing system and/or about distances between hardware components of said distributed computing system and resulting cable length.

5. The method according to claim 1, wherein said raw processing capacity corresponds to a capacity of said distributed computing system or a corresponding part of said distributed computing system that would be measured if said distributed computing system or a corresponding part of said distributed computing system is working without any coupling.

6. The method according to claim 1, wherein said coupling efficiency corresponds to a ratio of said effective processing capacity to said raw processing capacity.

7. A component of a distributed computing system having at least one processor device, the distributed computing system comprising at least one computer system and at least one coupling facility and offering a raw processing capacity, the raw processing capacity including an effective processing capacity and a coupling overhead, the component comprising:

an overhead calculator implemented into firmware and in electronic circuits capable of performing each one of:

determining a coupling efficiency inside said distributed computing system to compensate for said coupling overhead in said distributed computing system, determining and adding an amount of missing processing capacity to said effective processing capacity based on said coupling efficiency in a way, that the effective processing capacity of said raw processing capacity corresponds to a billable target processing capacity, wherein dynamic coupling overhead indicators and static configuration parameters of said distributed computing system are considered to determine said coupling efficiency, and the coupling efficiency corresponds to a ratio of said effective processing capacity to said raw processing capacity, and determining the coupling efficiency inside said distributed computing system to compensate for said coupling overhead in said distributed computing system using an overhead calculator.

8. The component according to claim 7, wherein the overhead calculator considers dynamic coupling overhead indicators and static configuration parameters of said distributed computing system to determine said coupling efficiency.

9. A distributed computing system offering a raw processing capacity, the raw processing capacity including an effective processing capacity and a coupling overhead, the distributed computer system comprising:

at least one computer system;

at least one processor device in the at least one computer system;

at least one coupling facility; and at least one hypervisor, in communication with the at least one processor device, implementing a method to compensate for the coupling overhead in at least one computer system of said distributed computing system by performing each of:

determining a coupling efficiency inside said distributed computing system to compensate for said coupling overhead in said distributed computing system, determining and adding an amount of missing processing capacity to said effective processing capacity based on said coupling efficiency in a way, that the effective processing capacity of said raw processing capacity corresponds to a billable target processing capacity, wherein dynamic coupling overhead indicators and static configuration parameters of said distributed computing system are considered to determine said coupling efficiency, and the coupling efficiency corresponds to a ratio of said effective processing capacity to said raw processing capacity, and determining the coupling efficiency inside said distributed computing system to compensate for said coupling overhead in said distributed computing system using an overhead calculator.

10. The distributed computing system according to claim 9, wherein said at least one overhead calculator provides said determined coupling efficiency to at least one processing capacity adjustment controller which in turn determines said amount of processing capacity to add and provides said determined amount of processing capacity to said at least one hypervisor.

11. The distributed computing system according to claim 10, wherein said at least one hypervisor takes additional processing capacity from a same computer system and another computer system and provides said total raw processing capacity to said distributed computing system or a part of said distributed computing system to compensate for said coupling overhead by dispatching work to regular computer systems and to offload computer systems of said distributed computing system.

12. An executable data processing program stored in memory of a data processing system having at least one processor device, the data processing program comprising:

software code portions for performing a method to compensate for coupling overhead in a distributed computing system when said program is run on said data processing system by performing each one of:

determining a coupling efficiency inside said distributed computing system to compensate for said coupling overhead in said distributed computing system, determining and adding an amount of missing processing capacity to said effective processing capacity based on said coupling efficiency in a way, that the effective processing capacity of said raw processing capacity corresponds to a billable target processing capacity, wherein dynamic coupling overhead indicators and static configuration parameters of said distributed computing system are considered to determine said coupling efficiency, and the coupling efficiency corresponds to a ratio of said effective processing capacity to said raw processing capacity, and determining the coupling efficiency inside said distributed computing system to compensate for said coupling overhead in said distributed computing system using an overhead calculator.

13. A computer program product stored on a non-transitory computer-usable medium, the computer program product comprising:

computer-readable program means for causing a computer to perform a method to compensate for coupling overhead in a distributed computing system when said program is run on said computer by performing each one of:

determining a coupling efficiency inside said distributed computing system to compensate for said coupling overhead in said distributed computing system, determining and adding an amount of missing processing capacity to said effective processing capacity based on said coupling efficiency in a way, that the effective processing capacity of said raw processing capacity corresponds to a billable target processing capacity, wherein dynamic coupling overhead indicators and static configuration parameters of said distributed computing system are considered to determine said coupling efficiency, and the coupling efficiency corresponds to a ratio of said effective processing capacity to said raw processing capacity, and determining the coupling efficiency inside said distributed computing system to compensate for said coupling overhead in said distributed computing system using an overhead calculator.

\* \* \* \* \*